United States Patent [19]

Roland

[11] Patent Number: 5,012,947

[45] Date of Patent: May 7, 1991

[54] WATER CHAMBER BAKING PAN

[76] Inventor: Edward W. Roland, 28 Anglers Cove, Hilton, N.Y. 14468

[21] Appl. No.: 493,690

[22] Filed: Mar. 15, 1990

[51] Int. Cl.⁵ .................................................. A47J 27/10
[52] U.S. Cl. ..................................... 220/428; 220/215; 220/426; 220/912; 99/410; 126/378
[58] Field of Search ............... 220/408, 428, 215, 912, 220/426, 427, 431, 432, 433; 99/410, 413; 126/376, 377, 378

[56] References Cited

U.S. PATENT DOCUMENTS

| | | | |
|---|---|---|---|
| 120,995 | 11/1871 | O'Sullivan | 220/427 X |
| 525,933 | 9/1894 | Wood | 126/377 |
| 1,334,930 | 3/1920 | Chadwick | 220/428 X |
| 1,341,972 | 6/1920 | Colquitt et al. | 126/377 |
| 4,010,736 | 3/1977 | Sacomani et al. | 126/369 |
| 4,331,127 | 5/1982 | Grosso | 126/377 |
| 4,439,656 | 3/1984 | Peleg | 219/10.55 E |
| 4,823,980 | 4/1989 | Ejiri | 220/408 |

FOREIGN PATENT DOCUMENTS

| | | | |
|---|---|---|---|
| 370441 | 2/1907 | France | 220/426 |
| 1108072 | 1/1956 | France | 220/428 |
| 1322179 | 2/1963 | France | 220/426 |
| 457815 | 7/1950 | Italy | 220/426 |
| 337614 | 11/1930 | United Kingdom | 220/428 |
| 695376 | 8/1953 | United Kingdom | 220/428 |

*Primary Examiner*—Stephen Marcus
*Assistant Examiner*—Stephen K. Cronin
*Attorney, Agent, or Firm*—Leon Gilden

[57] ABSTRACT

An apparatus defining a baking pan, including a planar floor, with a surrounding water chamber mounted about the floor defined by coaxially aligned internal and external walls, with a fill-spout cooperative between the walls to effect filling of the defined chamber by a fluid such as water. Modifications of the instant invention include the chamber open at its upper end defining an annulus cooperative with a lid defined by a complementary annulus aligned with the lower chamber to permit directing and circulation of steam in cooperation with the lower chamber. The modification further includes a downwardly depending externally threaded skirt cooperative with an internal threaded interior wall of the pan.

5 Claims, 4 Drawing Sheets

WATER CHAMBER BAKING PAN

BACKGROUND OF THE INVENTION

1. Field of the Invention

The field of invention relates to baking pans, and more particularly pertains to a new and improved water chamber baking pan wherein the same permits directing of a fluid chamber in an encircling relationship relative to an item to be baked to effect even baking temperatures throughout the item to be baked.

2. Description of the Prior Art

Cooking implements of various types have been utilized in the prior art, and the prior art has provided various implements utilizing water and the like to promote even heat distribution through the structure providing consistent and even heat. Such even distribution of heat is desired, particularly in a baking procedure to avoid over-baking of discrete portions of an item in relation to other components, wherein typically an external peripheral side surface of an item being baked is subject to greater heat concentrations than internal portions of the same item resulting in an unevenly baked product. The instant invention attempts to overcome deficiencies of the prior art by providing a consistent and relatively even temperature gradient through the product being baked. Examples of the prior art include U.S. Pat. No. 4,798,173 to Wilgran setting forth a dish structure containing a surrounding chamber directed through the walls and floor of the dish, with a pivotal lid mounted thereon.

U.S. Pat. No. 4,304,106 to Donnelly sets forth a tray member overlying a fluid chamber through the floor and wall portions of a bottom portion of the tray to provide and maintain a predetermined temperature within the tray structure.

U.S. Pat. No. 4,520,633 to Hoydic sets forth a bowl wherein a lower ice chamber is mounted in the bowl to effect cooling of contents within the bowl.

U.S. Pat. No. 3,383,880 to Peters sets forth a dish structure with a coextensive underlying floor chamber to contain a refrigerant therewithin.

U.S. Pat. No. 3,710,589 to Brown, et al., sets forth a chilling bowl for containing salads and the like, wherein the bowl includes a side wall and floor structure coextensive with thge bowl to effect chilling of foods therewithin.

As such, it may be appreciated that there continues to be a need for a new and improved water chamber baking pan wherein the same includes a surrounding water chamber directed about the perimeter of the floor structure to effect even heat distribution to an interior portion of a baking item and in this respect, the present invention substantially fulfills this need.

SUMMARY OF THE INVENTION

In view of the foregoing disadvantages inherent in the known types of water chamber dish structures now present in the prior art, the present invention provides a water chamber baking pan wherein the same includes a surrounding fluid chamber defined between the wall structures of the pan to effect an even heat distribution into contents of the pan. As such, the general purpose of the present invention, which will be described subsequently in greater detail, is to provide a new and improved water chamber baking pan which has all the advantages of the prior art baking pan structures and none of the disadvantages.

To attain this, the present invention provides an apparatus defining a baking pan, inlcuding a planar floor, with a surrounding water chamber mounted about the floor defined by coaxially aligned internal and external walls, with a fill-spout cooperative between the walls to effect filling of the defined chamber by a fluid such as water. Modifications of the instant invention include the chamber open at its upper end defining an annulus cooperative with a lid defined by a complementary annulus aligned with the lower chamber to permit directing and circulation of steam in cooperation with the lower chamber. The modification further includes a downwardly depending externally threaded skirt cooperative with an internally threaded interior wall of the pan.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of my invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved water chamber baking pan which has all the advantages of the prior art baking pan structures and none of the disadvantages.

It is another object of the present invention to provide a new and improved water chamber baking pan which may be easily and efficiently manufactured and marketed.

It is a further object of the present invention to provide a new and improved water chamber baking pan which is of a durable and reliable construction.

An even further object of the present invention is to provide a new and improved water chamber baking pan which is susceptible of a low cost of manufacture with regard to both materials and labor, and which accordingly is then susceptible of low prices of sale to the consuming public, thereby making such water chamber baking pans economically available to the buying public.

Still yet another object of the preset invention is to provide a new and improved water chamber baking pan which provides in the aparatuses and metods of the prior art some of the advantages thereof, while simultaneously overcoming some of the disadvantages normally associated therewith.

Still another object of the present invention is to provide a new and improved water chamber baking pan including spaced peripheral walls to define an enclosed chamber therebetween to accommodate fluid in permitting directing of consistent heat through a periphery of a baking item contained within the pan.

These together with other objects of the invention, along with the various features of novelty which characterize the invention, are pointed out with particularity in the claims annexed to and forming part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
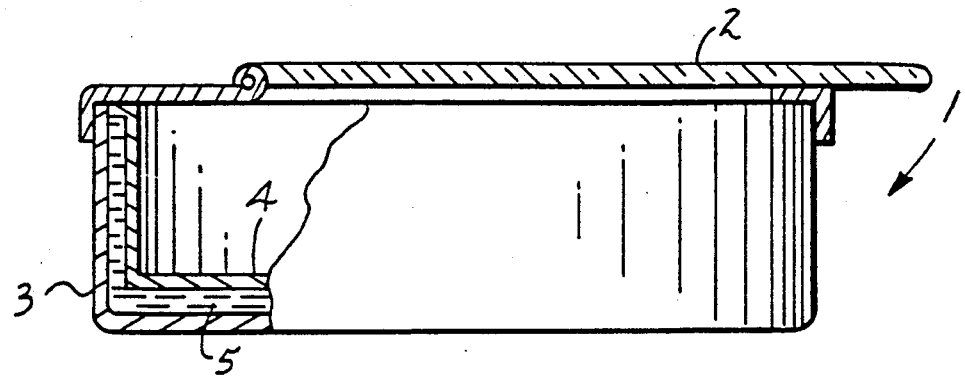
FIG. 1 is an orthographic side view, partially in section, of a prior art dish organization.

With reference now to the drawings, and in particular to FIGS. 1 to 8 thereof, a new and improved water chamber baking pan embodying the principles and concepts of the present invention and generally designated by the reference numerals 10 and 10a will be described.

Figure 2:
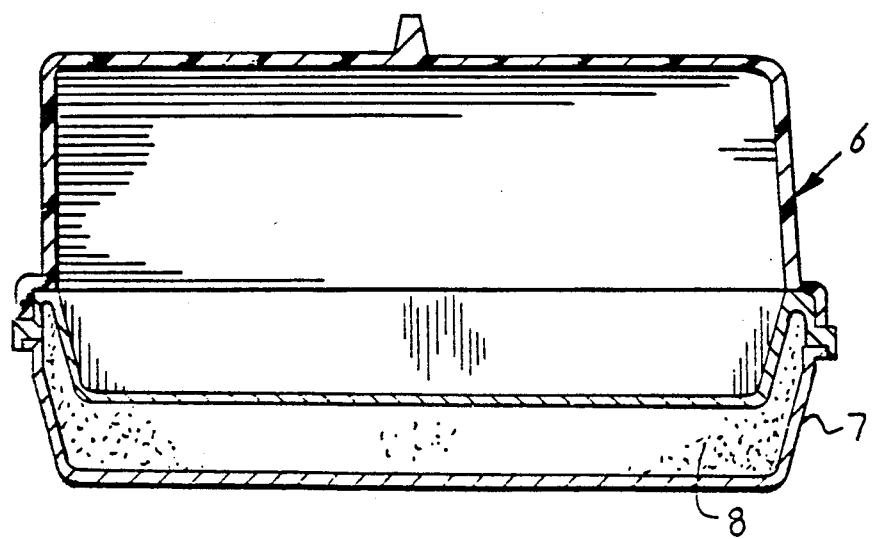
FIG. 2 is an orthographic cross-sectional view of a prior art pan structure including a fluid chamber.
Figure 3:
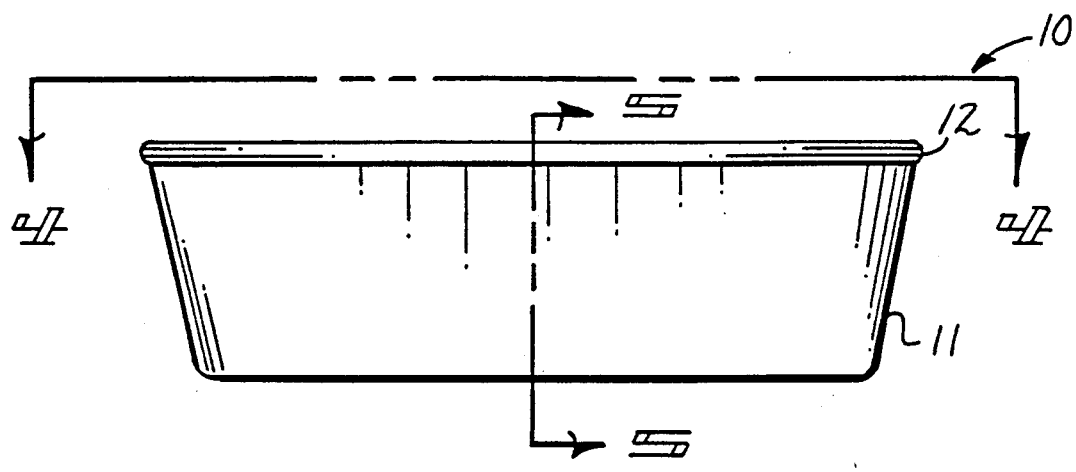
FIG. 3 is an orthographic side view of the instant invention.
Figure 4:
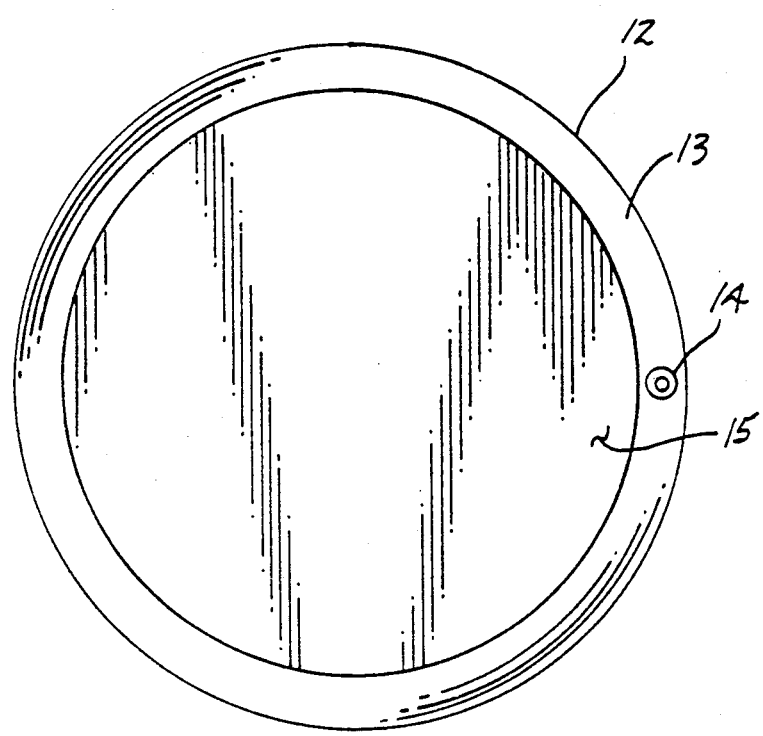
FIG. 4 is an orthographic top view of the invention.

FIG. 1 illustrates a prior art dish structure 1, wherein a lid 2 is pivotally mounted to an underlying dish structure defined by a spaced interior wall 4 and an exterior wall 3 to define an enclosing and encompassing water chamber 5 therebetween. FIG. 2 illustrates a further prior art dish structure 6, wherein a tray is received with an underlying support 7 to defined an enclosed chamber 8 therebetween, wherein the chamber is directed through side and bottom wall portions of the structure.

Figure 5:
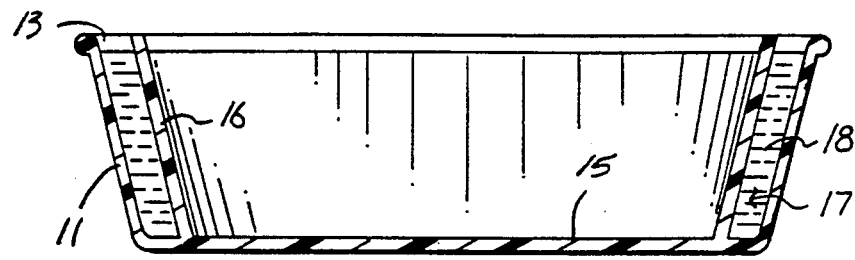
FIG. 5. is an orthographic view taken along the lines 5—5 of FIG. 3 in the direction indicated by the arrows.

More specifically, the water chamber baking dish 10 of the instant invention essentially comprises a container defined by an exterior side wall 11 defined by an upper rim 12 which in turn inlcudes a planar surface 13 arranged generally parallel to a planar floor 15. A fill opening 14 is directed through the planar surface 13 to permit directing of a fluid such as water through the fill opening into a fluid chamber 17 to permit directing of a fluid 18 therewithin. An interior side wall 16 is arranged coaxially of and interiorly of the exterior side wall 11, as illustrated in FIG. 5.

Figure 6:
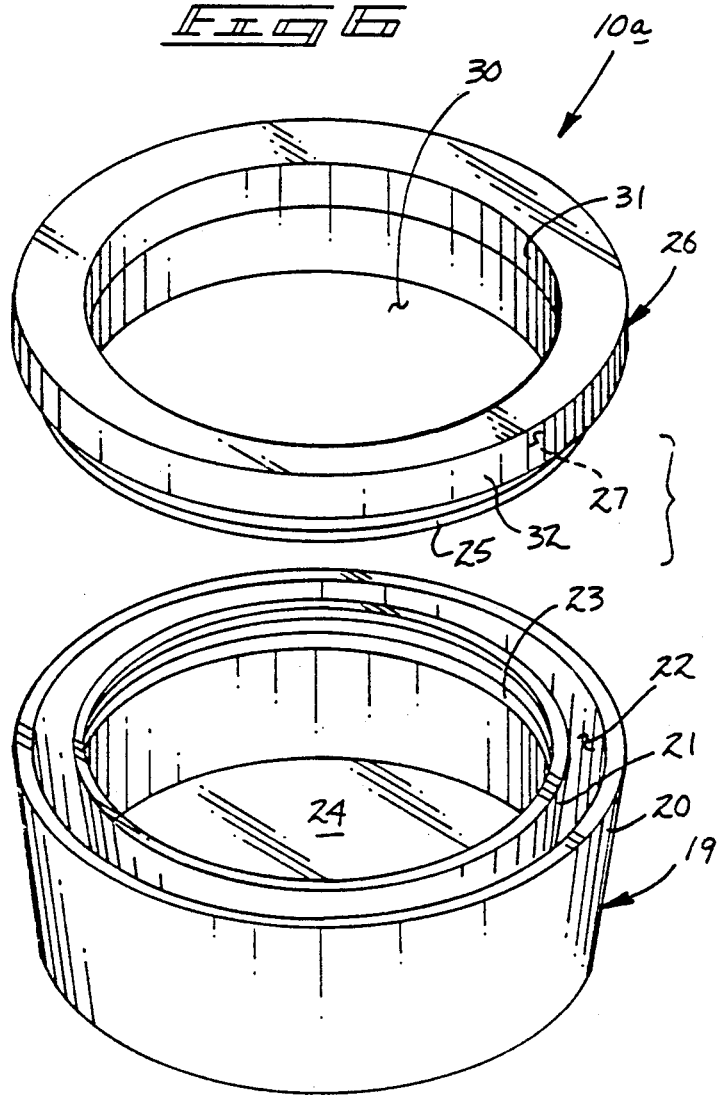
FIG. 6 is an isometric exploded illustration of a modification of the instant invention.
Figure 7:
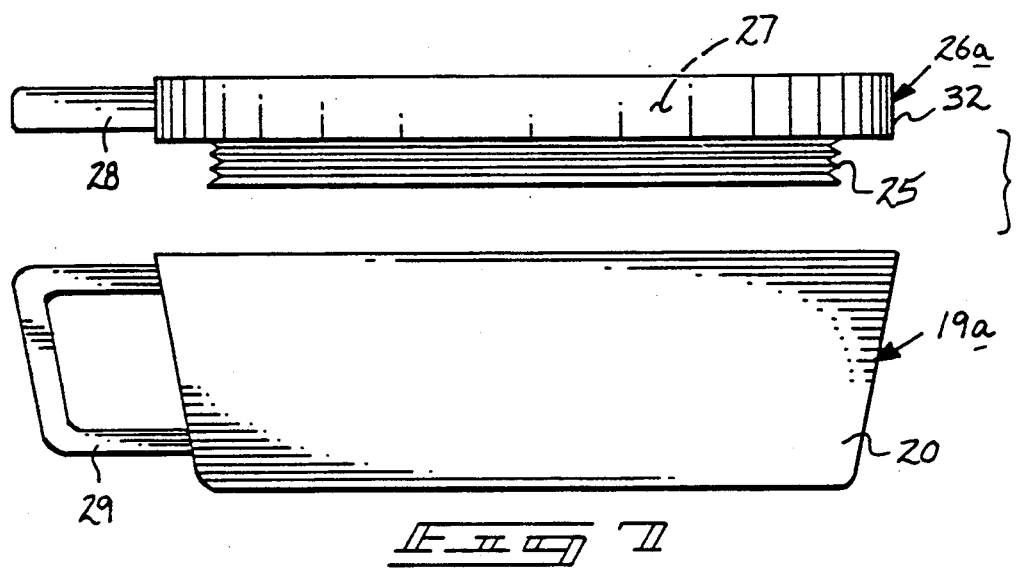
FIG. 7 is an orthographic side view of the modification of the instant invention.
Figure 8:
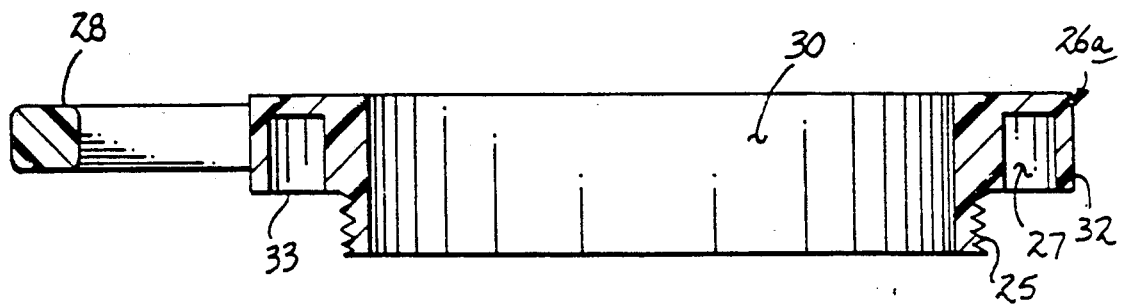
FIG. 8 is an orthographic cross-sectional view of the modified lid utilized by the instant invention.

FIG. 6 illustrates a modified baking pan 10a of the instant invention, inlcuding a pan housing 19 with a selectively securable lid 26 mounted to an upper end of the pan housing 19. The man housing includes an outer annular wall 20 coaxially arranged parallel to and spaced from an inner annular wall 21. A fluid chamber 22 is accordingly defined therebetween, with a planar floor 24 defining the remainder of the housing 19. Internal threads 23 are formed about an upper interior surface of the inner wall 21 to cooperate with an externally threaded annular skirt 25 of the lid 26. The skirt 25 includes an exterior diameter substantially equal to the interior diameter of the inner wall 21. The lid 26 includes a lid chamber therewithin cooperating with the fluid chamber 22 of the housing 19 to permit directing of steam and fluid circulation therethrough. Chamber 27 is defined as a generally doughnut shaped housing, as illustrated in FIG. 6 for example, with the skirt 25 extending downwardly therefrom. The modified lid, as illustrated in FIGS. 7 and 8, includes a lid handle 28 of generally "U" shaped configuration mounted thereon cooperative with a housing handle 29 mounted orthogonally to the outer wall 20 of the pan housing 19. The lid chamber 27 is defined by an annular entrance 33 aligned with the fluid chamber 22 of the housing 19. The lid 26 includes an annular interior lid wall 31 spaced from and parallel to an annular exterior lid wall 32, wherein a lower edge of the exterior lid wall 32 is aligned with an upper edge of the exterior wall, while a lower edge of the interior wall 31 is aligned with an upper edge of the interior wall 21 to permit directing of steam within the chamber 27 of the lid 26 which in turn includes a cylindrical opening 30 coaxially aligned and coextensive with the cavity of the housing 19.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water chamber baking pan apparatus comprising, in combination,
   a pan housing including a planar floor defined by an external periphery, and an exterior side wall mounted integrally to the external periphery of the floor, and an internal wall spaced interiorly from the external periphery coaxially aligned with the external wall defining a fluid chamber therebetween, and wherein the external wall includes an upper terminal edge and the interior wall includes a further upper terminal edge, and the interior wall includes a threaded interior surface, and a lid including a downwardly depending skirt, wherein the downwardly depending skirt includes external threads formed thereon cooperative with the internally threaded surface.

2. An apparatus as set forth in claim 1 wherein the skirt is defined by an internal diameter and the interior wall is defined by an external diameter, wherein the external diameter is substantially equal to the internal diameter.

3. An apparatus as set forth in claim 2 wherein the lid further includes an annular chamber, the annular chamber defined by an interior chamber wall spaced from an exterior chamber wall, and the interior chamber wall inlcuding a lower terminal edge aligned with the upper terminal edge of the interior wall, and the exterior lid wall including a lower terminal edge cooperative with the upper terminal edge of the external wall of the housing.

4. An apparatus as set forth in claim 3 wherein the lid includes a through-extending peripheral opening coaxially aligned with the interior surface of the interior wall.

5. An apparatus as set forth in claim 4 wherein the lid includes a handle integrally mounted to the lid and the housing includes a further handle mounted to the housing to enhance ease of rotation of the lid relative to the housing.

* * * * *